(12) United States Patent
Djokovich et al.

(10) Patent No.: US 6,952,458 B1
(45) Date of Patent: Oct. 4, 2005

(54) DEMAPPING SYSTEM AND METHOD

(75) Inventors: Igor Djokovich, Irvine, CA (US); Patrick Duvaut, Eatontown, NJ (US); Massimo Sorbara, Freehold, NJ (US)

(73) Assignee: GlobespanVirata, Inc., Red Bank, NJ (US)

( * ) Notice: Subject to any disclaimer, the term of this patent is extended or adjusted under 35 U.S.C. 154(b) by 814 days.

(21) Appl. No.: 09/969,323

(22) Filed: Oct. 2, 2001

Related U.S. Application Data (60) Provisional application No. 60/237,145, filed on Oct. 2, 2000.

(51) Int. Cl.[7] .............................................. H03D 1/00
(52) U.S. Cl. ...................... 375/341; 375/253; 375/261; 714/780; 714/796
(58) Field of Search ............................. 375/340, 261, 375/253, 341; 714/780, 796

(56) References Cited

U.S. PATENT DOCUMENTS

| | | | |
|---|---|---|---|
| 6,058,146 A * | 5/2000 | Yoshida | 375/341 |
| 6,195,396 B1 * | 2/2001 | Fang et al. | 375/261 |
| 6,353,911 B1 * | 3/2002 | Brink | 714/780 |
| 6,738,949 B2 * | 5/2004 | Senda et al. | 714/796 |
| 2002/0114398 A1 * | 8/2002 | Lin et al. | 375/253 |

* cited by examiner

*Primary Examiner*—Shuwang Liu
*Assistant Examiner*—Eva Zheng
(74) *Attorney, Agent, or Firm*—Thomas, Kayden, Horstemeyer & Risley (57) ABSTRACT

A demapping system and method for demapping symbols into bits, is provided. An embodiment of the system comprises a processor, and a memory that is coupled to the processor. The memory comprises a memory module that comprises a program that finds a hard demapper output d based on a received symbol r; finds a challenger $c_i$ for each i, the challenger $c_i$ is a challenger of the hard demapper output d, i is an integer whose maximum value is a number of bits of the challenger $c_i$; calculates reliability $m_i$ for each i, the reliability $m_i$ is the reliability of the hard demapper output d; and calculates soft bit $x_i$ for each i, the soft bit $x_i$ is calculated based on the reliability $m_i$.

20 Claims, 6 Drawing Sheets

DEMAPPING SYSTEM AND METHOD

CROSS-REFERENCE TO RELATED APPLICATION(S)

This application claims priority to copending U.S. provisional application entitled, "Soft Demapper for Odd QAM Constellation" having Ser. No. 60/237,145, filed Oct. 2, 2000, which is entirely incorporated herein by reference.

FIELD OF THE INVENTION

The present invention is generally related to the field of communications and, more particularly, is related to a system and method for demapping symbols into bits.

BACKGROUND OF THE INVENTION

Conventional mapping systems translate k-bit numbers into $2^k$ symbols, where k is an integer. Conventional demapping systems translate $2^k$ symbols into k-bit numbers. The translations create a robust transmission scheme, thereby reducing effects of induced channel noise. However, conventional demapping systems translate the $2^k$ symbols into k-bit numbers using a likelihood ratio that is complicated and lengthy to compute. Complicated and lengthy computations result in less efficient systems and methods.

Hence, a need exists in the industry to provide improved and more efficient demapping systems and methods.

SUMMARY OF THE INVENTION

A demapping system and method for demapping symbols into bits, is provided.

Briefly described, in architecture, one embodiment of the system, among others, can be implemented as follows. A processor, and a memory that is coupled to the processor. The memory comprises a memory module that comprises a program that finds a hard demapper output d based on a received symbol r; finds a challenger $c_i$ for each i, the challenger $c_i$ is a challenger of the hard demapper output d, i is an integer whose maximum value is a number of bits of the challenger $c_i$; calculates reliability $m_i$ for each i, the reliability $m_i$ is the reliability of the hard demapper output d; and calculates soft bit $x_i$ for each i, the soft bit $x_i$ is calculated based on the reliability $m_i$.

A demapping method is also provided. In this regard, one embodiment of such a method, among others, can be broadly summarized by the following steps: finding a hard demapper output d based on a received symbol r; finding a challenger $c_i$ for each i, the challenger $c_i$ is a challenger of the hard demapper output d, i is an integer whose maximum value is a number of bits of the challenger $c_i$; calculating reliability $m_i$ for each i, the reliability $m_i$ is the reliability of the hard demapper output d; and calculating soft bit $x_i$ for each i, the soft bit $x_i$ is calculated based on the reliability $m_i$.

Other features and advantages of the demapping system and method will be or become apparent to one with skill in the art upon examination of the following drawings and detailed description. It is intended that all such additional features and advantages be included within this description, be within the scope of the demapping system and method, and be protected by the accompanying claims.

BRIEF DESCRIPTION OF THE DRAWINGS

Many aspects of the present invention, which is the demapping system and method, can be better understood with reference to the following drawings. The components in the drawings are not necessarily to scale, emphasis instead being placed upon clearly illustrating the principles of the demapping system and method. Moreover, in the drawings, like reference numerals designate corresponding parts throughout the several views.

DETAILED DESCRIPTION OF THE PREFERRED EMBODIMENTS

Figure 1:
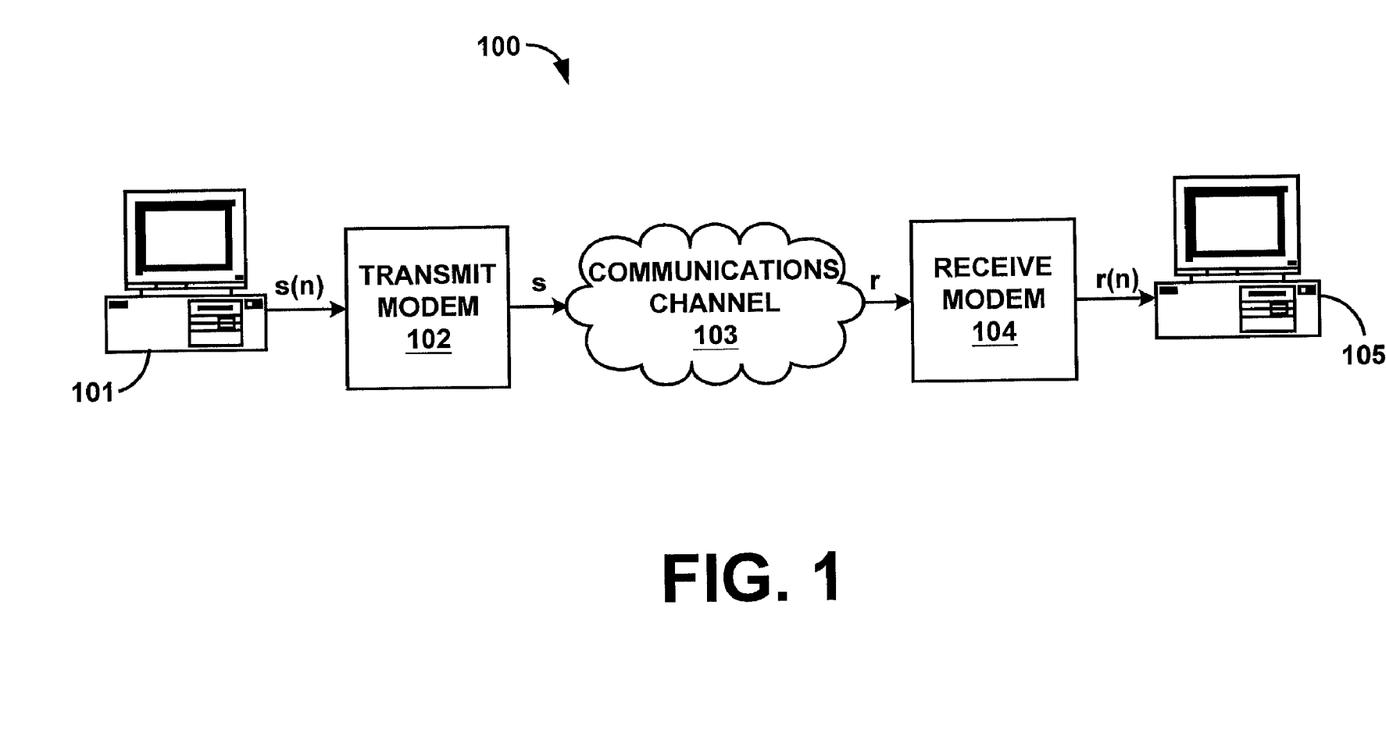
FIG. 1 is a block diagram of a communication system that comprises a demapping system.

FIG. 1 is a block diagram of a communication system 100 that comprises a demapping system. The communication system 100 comprises a transmit data endpoint 101, which is in electrical communication with a transmit modem 102 that is coupled to a communications channel 103. The communications channel 103 is, in turn, coupled to a receive modem 104, which is in electrical communication with a receive data endpoint 105. The transmit and receive data endpoints 101 and 105 may be any of a number of types of data communication equipment such as, computers, workstations, or other like device. The transmit data endpoint 101 generates digital data s(n), which is then supplied to the transmit modem 102, where it is modulated and transmitted as an analog signal s to the communications channel 103. Impulse response of the communications channel 103 results in a received analog signal r that is applied to the receive modem 104. The receive modem 104 generates received digital data r(n) which is supplied to the receive data endpoint 105. Ideally, the received digital data r(n) is identical to the digital data s(n) transmitted by the transmit data endpoint 101. However, inter-symbol interference (ISI), noise, and other factors, experienced in the communications channel 103, generally cause the data r(n) to differ from the data s(n). It is the task of the receive modem 104 to recover the digital data s(n) by reducing the ISI in a frequency domain. Although only unidirectional data communications is shown, it is understood that the transmit and receive modems 102 and 104 may facilitate bi-directional data communications. The unidirectional data communications is shown merely to facilitate the discussion of the demapping system and method.

Figure 2A:
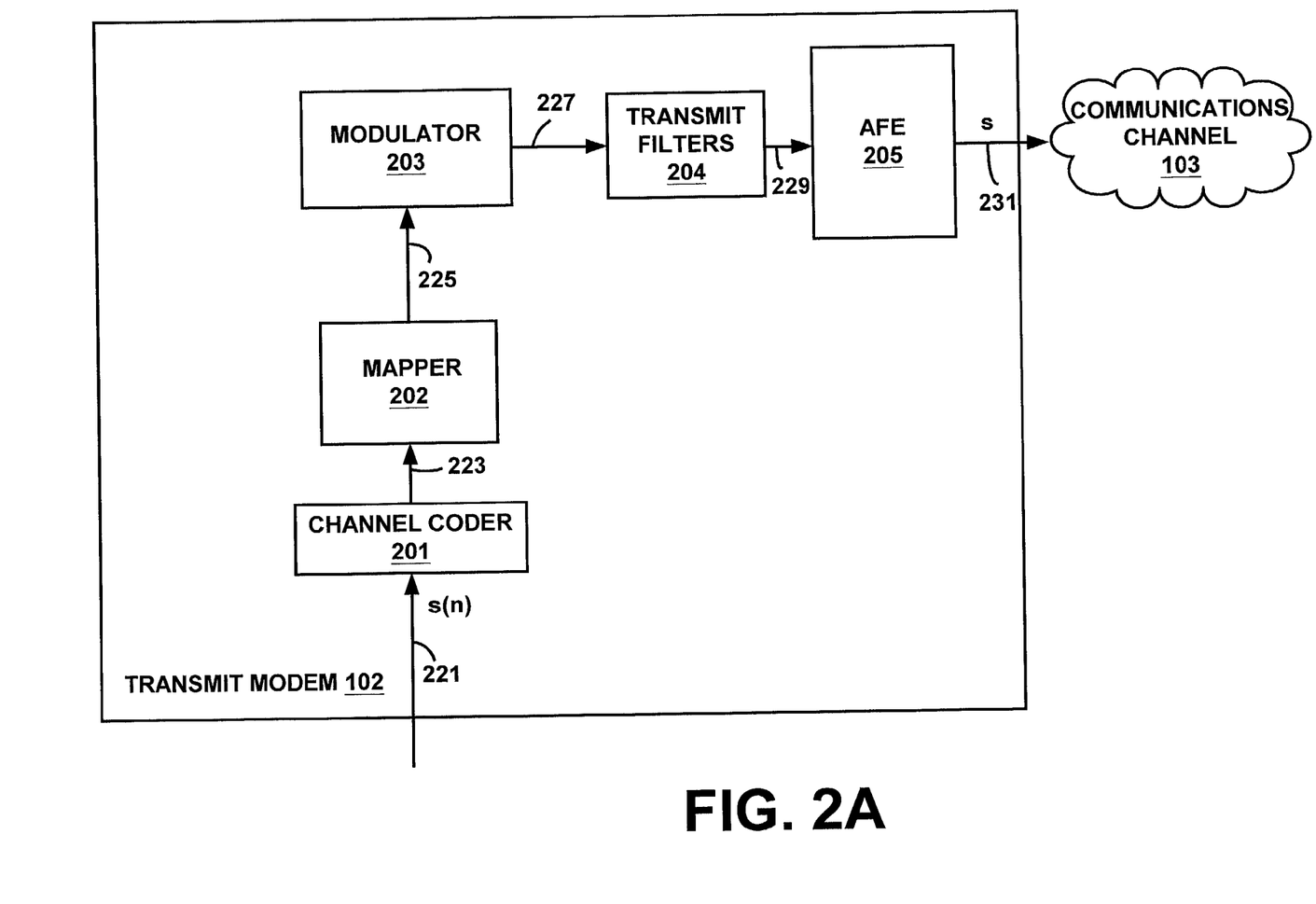
FIG. 2A is a block diagram of a transmit modem of FIG. 1.

FIG. 2A is a block diagram of the transmit modem 102 (FIG. 1). The transmit modem 102 comprises a channel coder 201, a mapper 202, a modulator 203, transmit filters 204, and an analog front-end (AFE) 205. A line 221 couples the channel coder 201 to the transmit data end point 101 (FIG. 1). Moreover, a line 223 couples the mapper 202 to the channel coder 201. Furthermore, a line 225 couples the modulator 203 to the mapper 202. Additionally, a line 227 couples the transmit filters 204 to the modulator 203. A line 229 couples the AFE 205 to the transmit filters 204 and a line 231 couples the communications channel 103 to the AFE 205.

The channel coder 201 receives the digital data s(n) from the transmit data end point 101 (FIG. 1) and adds redundancy to the data to reduce the probability of errors such as noise and the ISI of the communications channel 103, thereby producing an output. The mapper 202 receives the output of the channel coder 201 over the line 223, and maps the output from bits into symbols, such as, complex numbers of a constellation. For instance, the mapper 202 receives bits 000001011010100101110111, and divides the bits into groups 000, 001, 011, 010, 100, 101, 110, and 111. The mapper 202 then maps each of the group of bits into complex numbers of a constellation of two dimensions. The modulator 203 then receives the symbols from the mapper 202, and modulates the symbols into one or more carrier waveforms. Different types of modulation techniques include amplitude modulation (AM), phase modulation (PM), frequency modulation (FM), pulse amplitude modulation (PAM), carrierless amplitude/phase modulation (CAP), discrete multitone modulation (DMT), discrete wavelet multitone modulation (DWMT), and quadrature amplitude modulation (QAM). The modulation techniques comprise single-carrier or multi-carrier modulation.

QAM is one form of multi-level amplitude and phase modulation that is frequently employed in digital communication. In other words, QAM is a method of combining two amplitude modulated symbols into a single channel, thereby doubling the bandwidth of each of the symbols. QAM is used with PAM in digital systems, especially in wireless applications. In a QAM signal, there are two carriers, each having the same frequency but deferring in phase by 90°. One is called and in-phase (I) signal and the other is called a quadrature (Q) signal. Mathematically, the I signal can be represented by a sine wave, and the Q signal by a cosine wave. The two carriers are combined to produce the carrier waveform. Odd QAM is QAM when the number of bits, k, is odd, and even QAM is QAM when the number of bits, k, is even.

The transmit filters 204 filter the carrier waveform that is output from the modulator 203 to upsample the carrier waveform. The transmit filters 204 upsample the carrier waveform to generate an output. Upsampling the carrier waveform shapes the bandwidth of the carrier waveform to conform to the bandwidth of the communications channel 103. Shaping the bandwidth comprises interpolating the carrier waveform to enlarge the bandwidth of the carrier waveform. The AFE 205 comprises an amplifier, a digital-to-analog converter, and a line driver. The AFE 205 receives the output of the transmit filters 204, converts the output from a digital to an analog format and amplifies the output to produce the signal s. The AFE 205 then transmits the signal s via the communications channel 103 to the received modem 104 (FIG. 1).

Figure 2B:
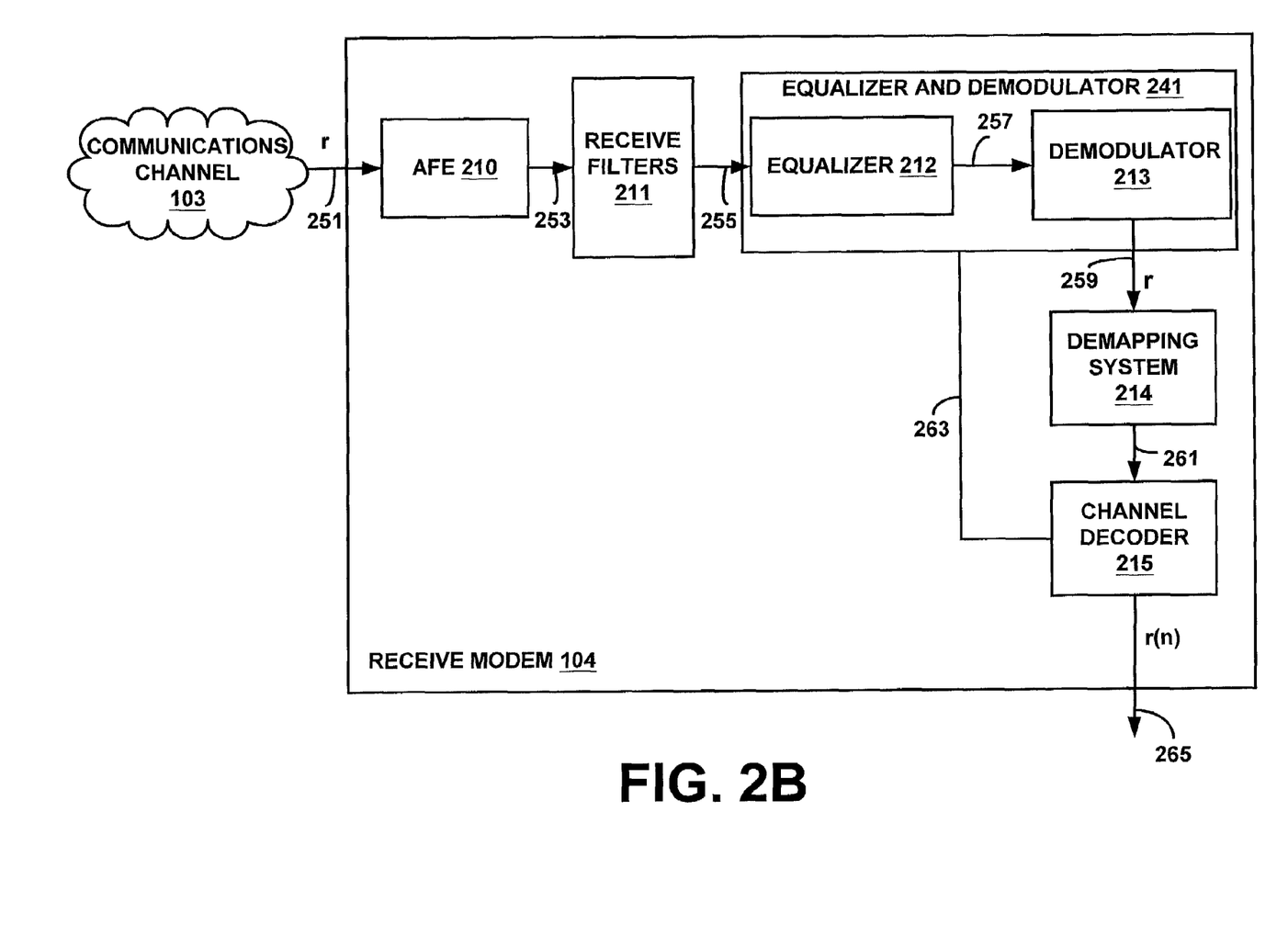
FIG. 2B is a block diagram of a receive modem of FIG. 1.

FIG. 2B is a block diagram of the receive modem 104 of FIG. 1. A line 251 couples the communications channel 103 to an AFE 210 and a line 253 couples the AFE 210 to receive filters 211. Moreover, a line 255 couples the receive filters 211 to an equalizer 212 and a line 257 couples the equalizer 212 to a demodulator 213. Furthermore, a line 259 couples the demodulator 213 to a demapping system 214 and a line 261 couples the demapping system 214 to a channel decoder 215. Additionally, a line 265 couples the channel decoder 215 to the receive data end point 105 (FIG. 1).

The AFE 210 comprises a line driver, an analog-to-digital converter, and an amplifier. The AFE 210 converts the signal r from an analog to a digital form, amplifies the converted signal, and outputs the amplified signal over the line 253. The receive filters 211 receives the output of the AFE 210, and downsamples the output to shape the bandwidth of the output. Moreover, the receive filters 211 may improve the signal-to-noise ratio (SNR) of the output. The receive filters 211, thus, provide an output. The equalizer 212 receives the output of the receive filters 211, and trains filters that are comprised in the equalizer 212, to reduce the errors that the communications channel 103 creates. The equalizer 212 trains the filters that it comprises, and hence, creates an output.

The demodulator 213 receives the output of the equalizer 212 and translates the output from a carrier waveform into symbols such as a received symbol r. Different types of demodulation techniques such as AM, PM, FM, PAM, CAP, DMT, DWMT, and QAM can be used. The demapping system 214 receives the symbols output from the demodulator 213, and demaps the symbols into bits. The channel decoder 215 then receives the bits and performs error correction on the bits by exploiting the redundancy introduced by the channel coder 201 (FIG. 2A). The channel decoder 215 then outputs the data r(n) to the receive data end point 105 (FIG. 1).

A line 263 is a feedback line that extracts information from the channel decoder 215 and sends the information to an equalizer and demodulator 241. The equalizer and demodulator 241 comprises the equalizer 212 and the demodulator 213. The information can be the reliability of decoding that is done by the channel decoder 215. The equalizer 212 and the demodulator 213 can use the information to conform their respective outputs to increase the reliability of decoding that is done by the channel decoder 215. The transmit modem 102 (FIG. 2A) and the receive modem 104 (FIG. 2B) can be used for single-carrier or multi-carrier modulation.

Figure 3:
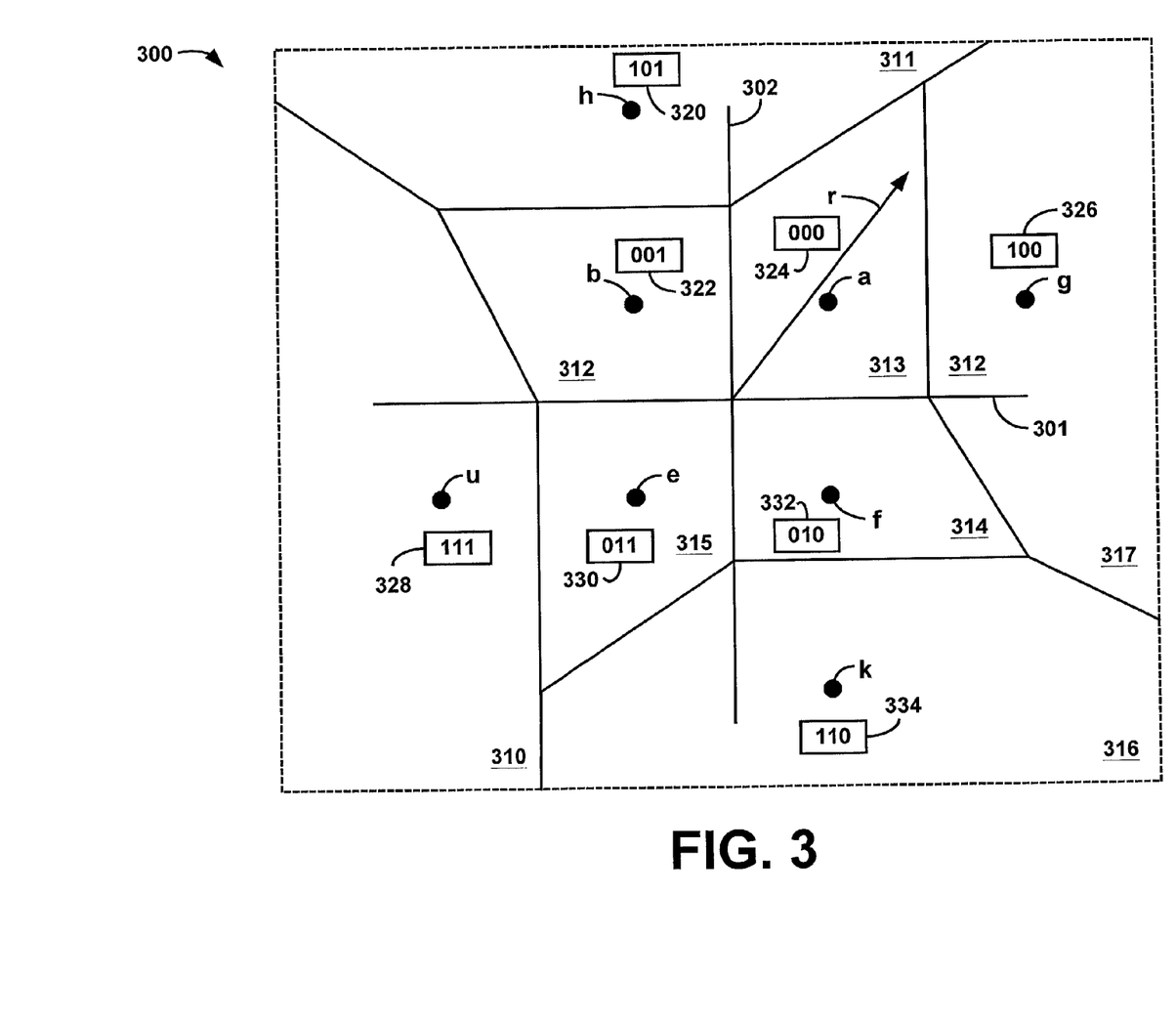
FIG. 3 is a diagram of a constellation that comprises symbols that the demapping system converts into bits.

FIG. 3 is a diagram of a constellation 300 that comprises symbols that the demapping system 214 (FIG. 2B) converts into soft bits. The constellation 300 comprises the received symbol r that is the output from the demodulator 213 (FIG. 2B). For QAM, r is a two-dimensional vector and a complex number.

$r = x + n$, where n is an additive white gaussian noise (AWGN) of the communications channel 103 (FIG. 1). n has a covariance matrix equal to $\gamma$ I. I is an identity matrix, and $\gamma$ is a variance of the noise n. In case of QAM, I is a two-dimensional matrix. x is any of the eight vectors a, b, e, f, g, h, k, and u, where a corresponds to bits 000, b corresponds to bit 001, e corresponds to 011, f corresponds to bit 010, g corresponds to bits 100, h corresponds to bits 101, k corresponds to bits 110, and u corresponds to bits 111. The bits 000 are shown in a box 324, the bits 001 are shown in a box 322, the bits 011 are shown in a box 330, the bits 010 are shown in a box 332, the bits 100 are shown in a box 326, the bits 101 are shown in a box 320, the bits 110 are shown in a box 334, and the bits 111 are shown in a box 328. Each of the eight vectors lie in each of eight octants 310–317, respectively. The correspondences are made for the purposes of illustration only. For instance, a could correspond to bits 101, instead of corresponding to bits 000. Note that eight vectors are selected only for the purposes of illustration. The eight vectors are selected to illustrate demapping corresponding to 8QAM. More or less than eight vectors can be used. For instance, thirty-two vectors can be used in case of 32QAM, one hundred and twenty-eight vectors can be used for 128QAM.

Axis 301 is an axis comprising real numbers ranging from zero to infinity, and axis 302 is an axis comprising imaginary numbers ranging from zero to infinity. For instance, in case of QAM, the axis 301 is a range from zero to infinity of in-phase components of the symbols and the axis 302 is a range from zero to infinity of quadrature components of the symbols.

Bit $b_i$ is a bit numbered i of any of the symbol r, and the vectors a, b, e, f, g, h, k, and u. $b_i$ is three bits, $b_2$, $b_1$, and $b_0$, in case of 8QAM. $b_2$ is a most significant bit (MSB), $b_1$ is a middle bit, and $b_0$ is a least significant bit (LSB). However, $b_i$ can be any number of bits. For instance, $b_i$ can be five bits in case of 32QAM. Likelihood ratio of $b_i$ given the symbol r is:

$$L(b_i/r) = \frac{P(b_i = 1/r)}{P(b_i = 0/r)} \qquad \text{Equation 1}$$

where $P(b_i=1/r)$ is the probability that the bit $b_i$ is one given the symbol r, and $P(b_i=0/r)$ is the probability that the bit $b_i$ is 0 given the symbol r. A high value of the likelihood ratio implies that it is more likely than not that the bit $b_i$ is equal to 1. On the other hand, a low value of the likelihood ratio implies that it is more likely than not that the bit $b_i$ is equal to 0. A value, close to 1, of the likelihood ratio implies that the value of the bit $b_i$ is uncertain.

For i=0, $$P(b_0=0/r)=P(x=a/r)+P(x=f/r)+P(x=k/r)+P(x=g/r) \qquad \text{Equation 2}$$

where $P(b_0=0/r)$ is the probability that the bit $b_0$ is zero given the symbol r, $P(x=a/r)$ is the probability that x is the vector a given the symbol r, $P(x=f/r)$ is the probability that x is the vector f given the symbol r, $P(x=k/r)$ is the probability that x is the vector k given the symbol r, and $P(x=g/r)$ is the probability that x is the vector g given the symbol r.

For i=0, $$P(b_0=1/r)=P(x=b/r)+P(x=e/r)+P(x=h/r)+P(x=u/r) \qquad \text{Equation 3}$$

where $P(b_0=1/r)$ is the probability that the bit $b_0$ is one given the symbol r, $P(x=b/r)$ is the probability that x is the vector b given the symbol r, $P(x=e/r)$ is the probability that x is the vector e given the symbol r, $P(x=h/r)$ is the probability that x is the vector h given the symbol r, and $P(x=u/r)$ is the probability that x is the vector u given the symbol r.

Bayes rule provides:

$$P(x = a/r) = \frac{P(r/x = a)P(x = a)}{P(r)}$$

where $P(r/x=a)$ is the probability of the symbol r given that the vector x is the vector a, $P(x=a)$ is the probability that the vector x is the vector a, and $P(r)$ is the probability of the symbol r.

Assuming the probability of each of the vectors a, b, e, f, g, h, k, and u is the same, and substituting equations 2, 3 and 4 into the equation 1, the likelihood ratio is $$L(b_i/r) = \frac{\sum_{w_{i,1}} P(r/w_{i,1})}{\sum_{w_{i,0}} P(r/w_{i,0})} \qquad \text{Equation 5}$$

where $\Sigma$ represents summation, $w_{i,0}$ is any of the vectors a, b, e, f, g, h, k, and u with the bit $b_i=0$; $w_{i,1}$ is any of the vectors a, b, e, f, g, h, k, and u with the bit $b_i=1$, $P(r/w_{i,1})$ is the probability of the vector r given the vector $w_{i,1}$ and $P(r/w_{i,0})$ is the probability of the vector r given the vector $w_{i,0}$.

A difference between even QAM soft demapping and odd QAM demapping is that in odd QAM, the likelihood ratio given by the equation 5 cannot be factorized into real part soft information and imaginary part soft information since in odd QAM constellations, real and imaginary parts are coupled. Hence, reliability of the bit $b_i=0$, $2 \geq i \geq 0$, depends upon the two-dimensional vectors, r, $w_{i,0}$, and $w_{i,1}$, each of which comprise both real and imaginary parts.

Assuming that the noise n is Gaussian, using a Gaussian probability density function as is known to people having ordinary skill in the art, the probability $$P(r/w_{i,1}) \propto \exp\left(-\frac{1}{2\gamma}(r - w_{i,1})^T(r - w_{i,1})\right) \qquad \text{Equation 6}$$

where $\propto$ means proportional, $(r-w_{i,1})^T$ is a transpose of $(r-w_{i,1})$, and $\gamma$ is a variance of the noise n.

Similarly, using the Gaussian density function, the probability $$P(r/w_{i,0}) \propto \exp\left(-\frac{1}{2\gamma}(r - w_{i,0})^T(r - w_{i,0})\right) \qquad \text{Equation 7}$$

where $\propto$ means proportional, $(r-w_{i,0})^T$ is a transpose of $(r-w_{i,0})$.

Substituting the equations 6 and 7 into the equation 5, if standard deviation, $\gamma^{1/2}$, of the noise n is lower than the lowest Euclidean distance between two vectors among the vectors a, b, e, f, g, h, k, and u, the equation 5 can be approximated by $$L(b_1/r) \approx \exp\left[-\frac{1}{2\gamma}(\|r - w^*_{i,1}\|^2 - \|r - w^*_{i,0}\|^2)\right] \qquad \text{Equation 8}$$

where $w^*_{i,1}$ is the closest vector to r with bit $b_i=1$, $w^*_{i,0}$ is the closest vector to r with bit $b_i=0$, $\|r-w^*_{i,1}\|^2$ is the square of an Euclidean distance between r and $w^*_{i,1}$, and $\|r-w^*_{i,0}\|^2$ is the square of an Euclidean distance between r and $w^*_{i,0}$.

Taking logarithm to the base 2 of the likelihood ratio in equation 8, the equation 8 becomes $$\Lambda(b_i/r) \approx \frac{1}{2\gamma}(\|r - w^*_{i,0}\|^2 - \|r - w^*_{i,1}\|^2) \qquad \text{Equation 9}$$

The demapping system 214 (FIG. 2B) can be implemented in software (e.g., firmware), hardware, or a combination thereof. In the currently contemplated best mode, the demapping system 214 (FIG. 2B) is implemented in software, as an executable program, and is executed by a special or general purpose digital computer, such as a personal computer (PC; IBM-compatible, Apple-compatible, or otherwise), workstation, minicomputer, or mainframe computer.

Figure 4:
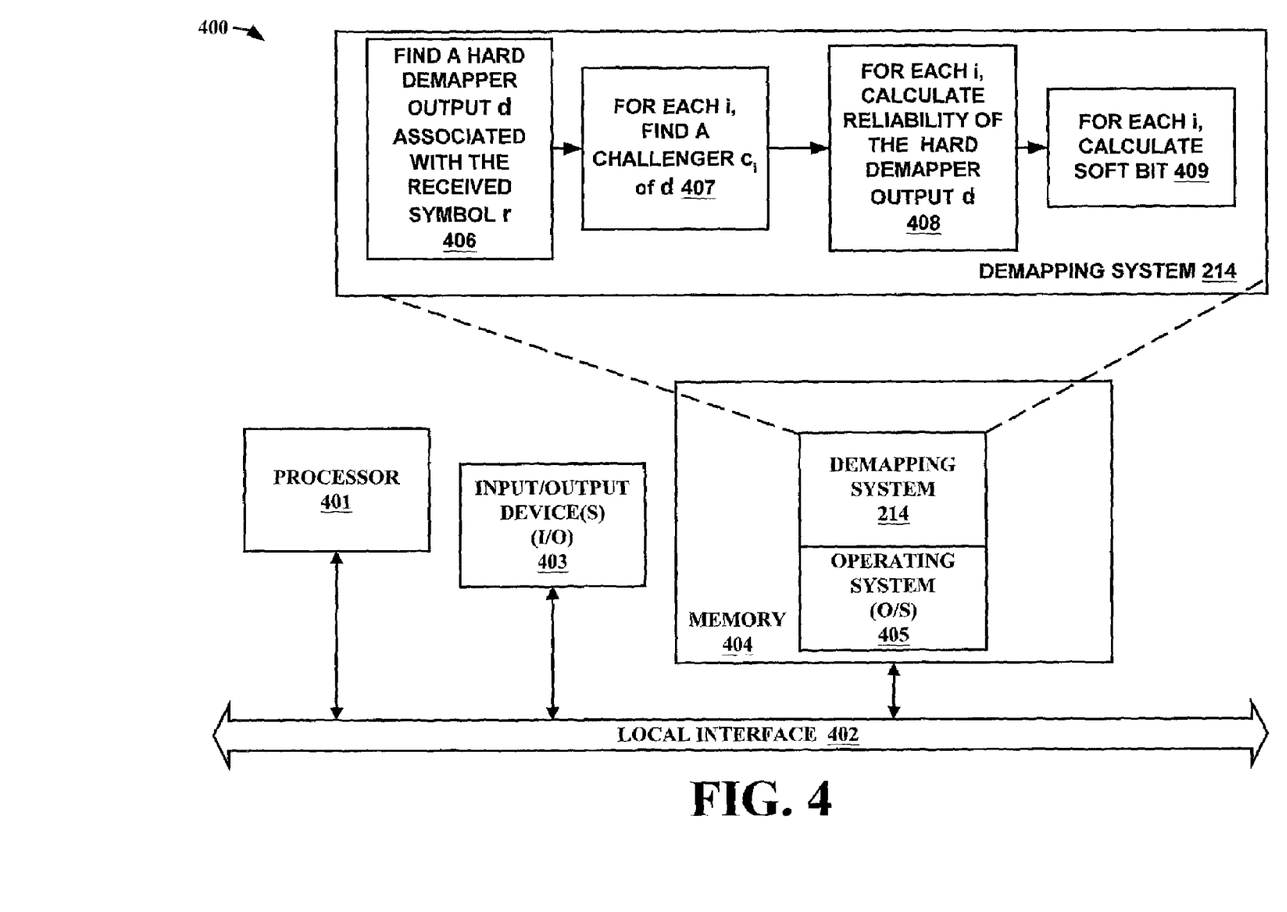
FIG. 4 is a diagram of an example of a general purpose computer that is configured to implement the demapping system.

FIG. 4 is an example of a general purpose computer 400 that implements the demapping system 214 (FIG. 2B). Generally, in terms of hardware architecture, as shown in FIG. 4, the computer 400 includes a processor 401, a memory 404, and one or more input and/or output (I/O) devices 403 (or peripherals) that are communicatively coupled via a local interface 402. The local interface 402 can be, for example but not limited to, one or more buses or other wired or wireless connections, as is known in the art. The local interface 402 may have additional elements, which are omitted for simplicity, such as controllers, buffers (caches), drivers, repeaters, and receivers, to enable communications. Further, the local interface 402 may include address, control, and/or data connections to enable appropriate communications among the aforementioned components.

The processor 401 is a hardware device for executing software, particularly that stored in memory 404. The processor 401 can be any custom made or commercially available processor, a central processing unit (CPU), an auxiliary processor among several processors associated with the computer 400, a semiconductor based microprocessor (in the form of a microchip or chip set), a macroprocessor, or generally any device for executing software instructions. Examples of suitable commercially available microprocessors are as follows: a PA-RISC series microprocessor from Hewlett-Packard Company, an 80x86 or Pentium series microprocessor from Intel Corporation, a PowerPC microprocessor from IBM, a Sparc microprocessor from Sun Microsystems, Inc, or a 68xxx series microprocessor from Motorola Corporation.

The memory 404 can include any one or combination of volatile memory elements (e.g., random access memory (RAM, such as DRAM, SRAM, SDRAM, etc.)) and non-volatile memory elements (e.g., ROM, hard drive, tape, CDROM, etc.). Moreover, the memory 404 may incorporate electronic, magnetic, optical, and/or other types of storage media. Note that the memory 404 can have a distributed architecture, where various components are situated remote from one another, but can be accessed by the processor 401.

The software in memory 404 may include one or more separate programs, each of which comprises an ordered listing of executable instructions for implementing logical functions. In the example of FIG. 4, the software in the memory 404 includes the demapping system 214 and a suitable operating system (O/S) 405. A nonexhaustive list of examples of suitable commercially available O/S 405 is as follows: (a) a Windows O/S available from Microsoft Corporation; (b) a Netware O/S available from Novell, Inc.; (c) a Macintosh O/S available from Apple Computer, Inc.; (e) a UNIX O/S, which is available for purchase from many vendors, such as the Hewlett-Packard Company, Sun Microsystems, Inc., and AT&T Corporation; (d) a LINUX O/S, which is freeware that is readily available on the Internet; (e) a run time Vxworks O/S from WindRiver Systems, Inc.; or (f) an appliance-based O/S, such as that implemented in handheld computers or personal data assistants (PDAs) (e.g., PalmOS available from Palm Computing, Inc., and Windows CE available from Microsoft Corporation). The O/S 405 essentially controls the execution of other computer programs, such as the demapping system 214, and provides scheduling, input-output control, file and data management, memory management, and communication control and related services.

The demapping system 214 may be implemented through a source program, executable program (object code), script, or any other entity comprising a set of instructions to be performed. When a source program, then the program needs to be translated via a compiler, assembler, interpreter, or the like, which may or may not be included within the memory 404, so as to operate properly in connection with the O/S 405. Furthermore, the demapping system 214 can be written as (a) an object oriented programming language, which has classes of data and methods, or (b) a procedure programming language, which has routines, subroutines, and/or functions, for example but not limited to, C, C++, Pascal, Basic, Fortran, Cobol, Perl, Java, and Ada.

The I/O devices 403 may include input devices, for example but not limited to, a keyboard, mouse, scanner, microphone, etc. Furthermore, the I/O devices 403 may also include output devices, for example, but not limited to, a printer, display, etc. Finally, the I/O devices 403 may further include devices that communicate both inputs and outputs, for instance but not limited to, a modulator/demodulator (modem; for accessing another device, system, or network), a radio frequency (RF) or other transceiver, a telephonic interface, a bridge, a router, etc.

If the computer 400 is a PC, workstation, or the like, the software in the memory 404 may further include a basic input output system (BIOS) (omitted for simplicity). The BIOS is a set of essential software routines that initialize and test hardware at startup, start the O/S 405, and support the transfer of data among the hardware devices. The BIOS is stored in ROM so that the BIOS can be executed when the computer 400 is activated.

When the computer 400 is in operation, the processor 401 is configured to execute software stored within the memory 404, to communicate data to and from the memory 404, and to generally control operations of the computer 400 pursuant to the software. The demapping system 214 and the O/S 405, in whole or in part, but typically the latter, are read by the processor 401, perhaps buffered within the processor 401, and then executed.

When the demapping system 214 is implemented in software, as is shown in FIG. 4, it should be noted that the demapping system 214 can be stored on any computer readable medium for use by or in connection with any computer related system or method. In the context of this document, a computer readable medium is an electronic, magnetic, optical, or other physical device or means that can contain or store a computer program for use by or in connection with a computer related system or method. The demapping system 214 can be embodied in any computer readable medium for use by or in connection with an instruction execution system, apparatus, or device, such as a computer-based system, processor-containing system, or other system that can fetch the instructions from the instruction execution system, apparatus, or device and execute the instructions.

In the context of this document, a "computer readable medium" can be any means that can store, communicate, propagate, or transport the program for use by or in connection with the instruction execution system, apparatus, or device. The computer readable medium can be, for example but not limited to, an electronic, magnetic, optical, electromagnetic, infrared, or semiconductor system, apparatus, device, or propagation medium. More specific examples (a nonexhaustive list) of the computer readable medium would include the following: an electrical connection (electronic) having one or more wires, a portable computer diskette (magnetic), a random access memory (RAM) (electronic), a read-only memory (ROM) (electronic), an erasable programmable read-only memory (EPROM, EEPROM, or Flash memory) (electronic), an optical fiber (optical), and a portable compact disc read-only memory (CDROM) (optical). Note that the computer readable medium could even be paper or another suitable medium upon which the program is printed, as the program can be electronically captured, via, for instance, optical scanning of the paper or other medium, then compiled, interpreted or otherwise processed in a suitable manner if necessary, and then stored in a computer memory.

In an alternative embodiment, where the demapping system 214 is implemented in hardware, the demapping system can implemented with any or a combination of the following technologies, which are each well known in the art: a discrete logic circuit(s) having logic gates for implementing logic functions upon data signals, an application specific integrated circuit (ASIC) having appropriate combinational logic gates, a programmable gate array(s) (PGA), a field programmable gate array (FPGA), etc.

An embodiment of the demapping system 214 comprises memory modules 406–409. The memory module 406 comprises a program to find a hard demapper output d associated with the received symbol r. d comprises hard bit $d_i$. For 8QAM, $2 \geq i \geq 0$, which means that d comprises three hard bits. Each of the three hard bits is preferably a 0 or a 1. Alternately, each of the three hard bits is a −1 of a 1. For 32 QAM, $5 \geq i \geq 0$, which means that d comprises five hard bits, and for 128 QAM, $7 \geq i \geq 0$, which means that d comprises seven hard bits. The hard demapper output d is found according to a minimum Euclidean distance criterion so that d is at a minimum Euclidean distance from the vector r. For the constellation 300 (FIG. 3), a hard decision is that d=g since the Euclidean distance between r and g is minimum among the Euclidean distances between each of the vectors a, b, e, f, g, h, k, and u, and the symbol r. The hard demapper output d can, alternately, be found using any other method known to people having ordinary skill in the art.

The memory module 407 comprises a program to find a challenger $c_i$ of d, where $c_i$ is any one of the vectors a, b, e, f, h, k, and u that is closest to the received symbol r and has a bit numbered i opposite to a bit numbered i of the hard demapper output d. The challenger $c_i$ is found for each i, where i is an integer whose maximum value is the number of bits that the challenger $c_i$, comprises. For example, for the constellation 300 of FIG. 3, $c_0$=h, $c_1$=f, and $c_2$=a. h is the closest vector to r among the vectors a, b, e, f, h, k, and u and the least significant bit of h is opposite to the least significant bit of d. f is the closest vector to r among the vectors a, b, e, f, h, k, and u, and the middle bit of f is opposite to the middle bit of d. a is the closest vector to r among the vectors a, b, e, f, h, k, and u, and the most significant bit of a is opposite to the most significant bit of d.

The memory module 408 comprises a program for calculating, for each i, reliability $m_i$ of the hard decision d. The reliability is calculated using $$m_i = \frac{1}{4}(\|r - c_i\|^2 - \|r - d\|^2)$$

where $\|r-c_i\|^2$ is the square of an Euclidean distance between r and $c_i$, and $\|r-d\|^2$ is the square of an Euclidean distance between r and d. The reliability $m_i$ is always positive. For 8QAM, three $m_i$'s will be obtained from the equation 10 since for 8QAM, $2 \geq i \geq 0$. An $m_i$ with a high value means that $c_i$ is far from d, and the hard decision that d=g, is reliable. On the other hand, an $m_i$ with a low value means that $c_i$ is close to d, and the hard decision that d=g, is not reliable. Alternately, for 32QAM, five $m_i$'s will be obtained from the equation 10 since for 32QAM, $5 \geq i \geq 0$, and for 128 QAM, seven $m_i$'s will be obtained from the equation 10 since for 128QAM, $7 \geq i \geq 0$.

The memory module 409 comprises a program for calculating, for each i, a soft bit $x_i$. The soft bit $x_i$ is a product of the reliability and a tangent bi-phase shift keying (BPSK) value associated with the hard bits $d_i$ of the hard demapper output d:

$$x_i = m_i(2d_i - 1) \qquad \text{Equation 11}$$

For 8QAM, three $x_i$'s will be obtained from the equation 11 since for 8 QAM, $2 \geq i \geq 0$. Each soft bit $x_i$ is preferably a value between −1 and 1. Each value of the soft bit $x_i$ can correspond to either a −1 or a 1. The values of −1 or a 1 are values of a hard bit. For instance, a value of 0.7 of the soft bit $x_i$ corresponds to the value 1 of a hard bit. A value of −0.5 of the soft bit $x_i$ corresponds to the value −1 of a hard bit. Hence, the soft bit $x_i$ can be represented in the form of a hard bit. Alternately, for 32QAM, five $x_i$'s will be obtained from the equation 11 since for 32QAM, $5 \geq i \geq 0$, and for 128 QAM, seven $x_i$'s will be obtained from the equation 11 since for 128QAM, $7 \geq i \geq 0$.

The processor 401 runs the programs comprised in the memory modules 406–409 to calculate the soft bit $x_i$ for each i. The programs in the memory modules 406–409 may be comprised in a single memory module.

Figure 5:
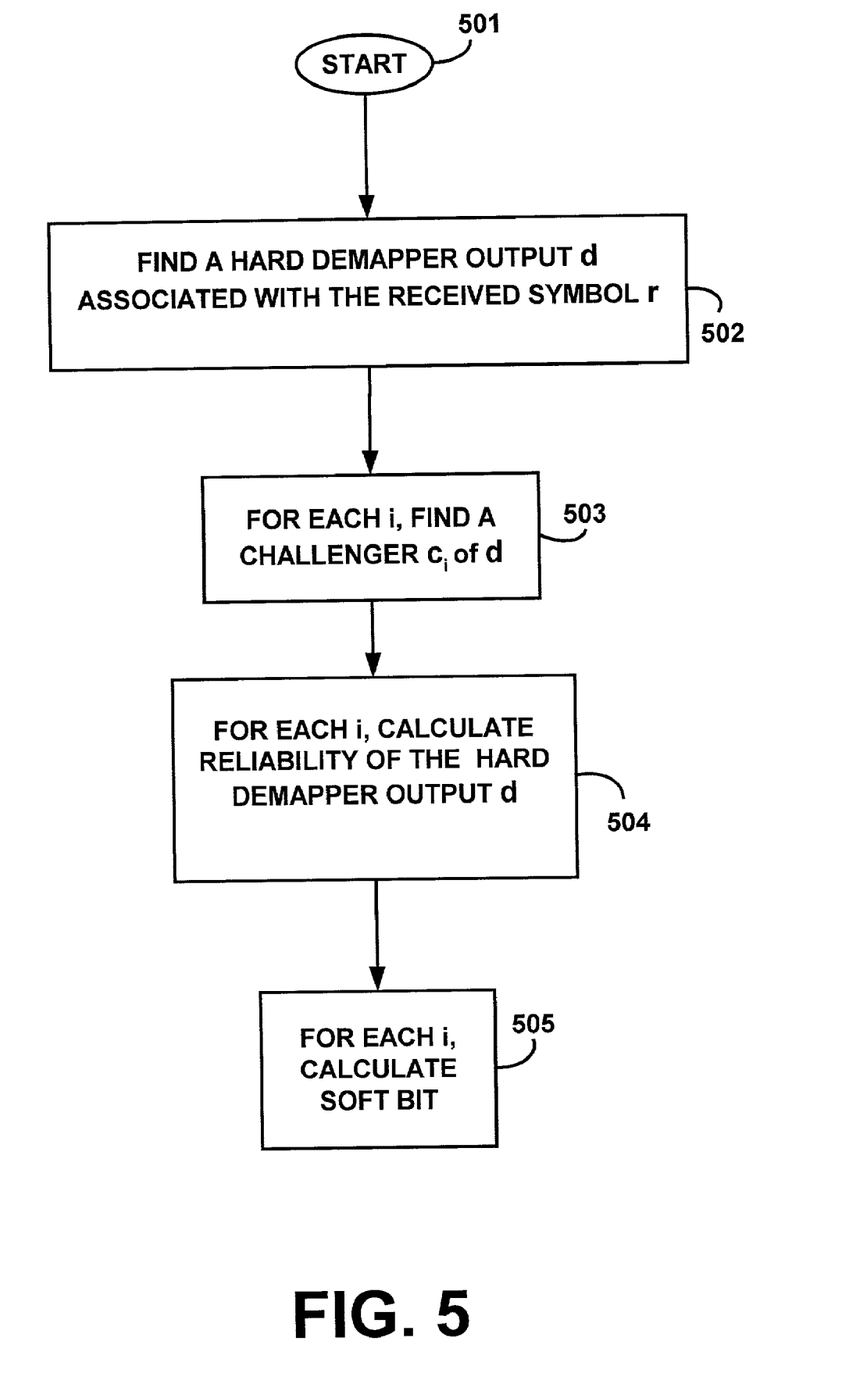
FIG. 5 is a flow chart describing a preferred embodiment of a method for demapping a symbol into bits.

FIG. 5 is a flow chart describing a preferred embodiment of a method for demapping a symbol into bits. The method starts in a step 501. In step 502, the hard demapper output d, associated to the received symbol r, is found. In step 503, the challenger $c_i$, of the hard demapper output d, is found. The challenger $c_i$ is found for each i. Step 504 calculates the reliability $m_i$ of the hard demapper output d. The reliability $m_i$ is found for each i. Step 505 calculates the soft bit $x_i$ from the reliability $m_i$. The soft bit $x_i$ is found for each i.

Any process descriptions or blocks in the flow chart of FIG. 5 should be understood as representing modules, segments, or portions of code which include one or more executable instructions for implementing specific logical functions or steps in the demapping method, and alternate implementations are included within the scope of the preferred embodiment of the demapping method in which functions may be executed out of order from that shown or discussed, including substantially concurrently or in reverse order, depending on the functionality involved, as would be understood by those reasonably skilled in the art of the present invention.

Calculating the soft bits using the demapping system and method is less complicated than calculating the bits based on the likelihood ratio of the equation 5 since calculating the reliability $m_i$ using the equation 10 is less complicated than calculating the likelihood ratio using the equation 5. Reduced complications generally result in a reduced time to compute the soft bits, and in a simpler circuitry to implement the demapping system and method. Hence, the demapping system and method is less complicated, less time consuming, and cheaper than a system and method comprising the equation 5.

The demapping system and method can be used with any kind of modulation or demodulation including, but not limited to, AM, FM, PM, PAM, CAP, DMT, DWMT, and QAM. However, preferably, the demapping system and method is used for odd QAM such as 8QAM, 32QAM, and 128QAM. The demapping system and method is also preferably used in any digital communication chain that involves single-carrier or multiple-carrier 8QAM with soft demapping. Examples of single or multiple carrier 8QAM with soft demapping include turbo-coding, turbo-equalization, and trellis-coded modulation (TCM). Turbo-coding is described in B. Vucetic, J. Yuan, Turbo-Codes, Principles & Applications, Kluwer Academic Publishers (2000), which is incorporated by reference herein in its entirety. Turbo-equalization is described in M. Tuchler, Iterative Correction Of ISI Via Equalization And Decoding With Priors, p. 100, IEEE Symposium on Inf. Theory (2000), which is incorporated by reference in its entirety. Trellis-coded modulation is described in E. Biglieri, Introduction to Trellis Coded Modulation & Applications, MacMillan (1991), which is incorporated by reference in its entirety.

It should be emphasized that the above-described embodiments of the present invention, particularly, any "preferred" embodiments, are merely possible examples of implementations, merely set forth for a clear understanding of the principles of the invention. Many variations and modifications may be made to the above-described embodiment(s) of the invention without departing substantially from the spirit and principles of the invention. All such modifications and variations are intended to be included herein within the scope of this disclosure and the present invention and protected by the following claims.

What is claimed is:

1. A demapping system for demapping symbols into soft bits, comprising:
    a processor;
    a memory coupled to the processor, the memory comprising:
    a memory module that comprises a program that finds a hard demapper output d based on a received symbol r; finds a challenger $c_i$ for each i, the challenger $c_i$ is a challenger of the hard demapper output d, i is an integer whose maximum value is a number of bits of the challenger $c_i$; calculates reliability $m_i$ for each i, the reliability $m_i$ is the reliability of the hard demapper output d; and calculates soft bit $x_i$ for each i, the soft bit $x_i$ is calculated based on the reliability $m_i$.

2. The demapping system of claim 1, wherein the hard demapper output d is found based upon a minimum Euclidean distance criterion.

3. The demapping system of claim 1, wherein the reliability is calculated by $$m_i = \frac{1}{4}(\|r - c_i\|^2 - \|r - d\|^2)$$

$\|r-c_i\|^2$ being a square of an Euclidean distance between the received symbol r and the challenger $c_i$, and $\|r-d\|^2$ being a square of an Euclidean distance between the received symbol r and the hard demapper output d.

4. The demapping system of claim 3, wherein the soft bit $x_i$ is calculated using $x_i = m_i (2d_i - 1)$, $d_i$ being a bit numbered i of the hard demapper output d.

5. The demapping system of claim 1, wherein the demapping is done for odd quadrature amplitude modulation (QAM).

6. A demapping method for demapping symbols into soft bits, comprising the steps of:
    finding a hard demapper output d based on a received symbol r;
    finding a challenger $c_i$ for each i, the challenger $c_i$ is a challenger of the hard demapper output d, i is an integer whose maximum value is a number of bits of the challenger $c_i$;
    calculating reliability $m_i$ for each i, the reliability $m_i$ is the reliability of the hard demapper output d; and
    calculating soft bit $x_i$ for each i, the soft bit $x_i$ is calculated based on the reliability $m_i$.

7. The demapping method of claim 6, wherein the hard demapper output d is found based upon a minimum Euclidean distance criterion.

8. The demapping method of claim 6, wherein the reliability is calculated by $$m_i = \frac{1}{4}(\|r - c_i\|^2 - \|r - d\|^2)$$

$\|r-c_i\|^2$ being a square of an Euclidean distance between the received symbol r and the challenger $c_i$, and $\|r-d\|^2$ being a square of an Euclidean distance between the received symbol r and the hard demapper output d.

9. The demapping method of claim 8, wherein the soft bit $x_i$ is calculated using $x_i = m_i (2d_i - 1)$, $d_i$ being a bit numbered i of the hard demapper output d.

10. The demapping method of claim 9, wherein the demapping is done for odd quadrature amplitude modulation (QAM).

11. A demapping system for demapping symbols into soft bits, comprising:
    means for finding a hard demapper output d based on a received symbol r;
    means for finding a challenger $c_i$ for each i, the challenger $c_i$ is a challenger of the hard demapper output d, i is an integer whose maximum value is a number of bits of the challenger $c_i$;
    means for calculating reliability $m_i$ for each i, the reliability $m_i$ is the reliability of the hard demapper output d; and
    means for calculating soft bit $x_i$ for each i, the soft bit $x_i$ is calculated based on the reliability $m_i$.

12. The demapping system of claim 11, wherein the hard demapper output d is found based upon a minimum Euclidean distance criterion.

13. The demapping system of claim 12, wherein the reliability is calculated by $$m_i = \frac{1}{4}(\|r - c_i\|^2 - \|r - d\|^2)$$

$\|r-c_i\|^2$ being a square of an Euclidean distance between the received symbol r and the challenger $c_i$, and $\|r-d\|^2$ being a square of an Euclidean distance between the received symbol r and the hard demapper output d.

14. The demapping system of claim 12, wherein the soft bit $x_i$ is calculated using $x_i = m_i (2d_i - 1)$, $d_i$ being a bit numbered i of the hard demapper output d.

15. The demapping system of claim 11, wherein the demapping is done for odd quadrature amplitude modulation (QAM).

16. A computer readable medium having a computer program for demapping symbols into bits, the program performing the steps of:
   finding a hard demapper output d based on a received symbol r;
   finding a challenger $c_i$ for each i, the challenger $c_i$ is a challenger of the hard demapper output d, i is an integer whose maximum value is a number of bits of the challenger $c_i$;
   calculating reliability $m_i$ for each i, the reliability $m_i$ is the reliability of the hard demapper output d; and
   calculating soft bit $x_i$ for each i, the soft bit $x_i$ is calculated based on the reliability $m_i$.

17. The computer readable medium of claim 16, wherein the hard demapper output d is found based upon a minimum Euclidean distance criterion.

18. The computer readable method of claim 17, wherein the reliability is calculated by $$m_i = \frac{1}{4}(\|r-c_i\|^2 - \|r-d\|^2)$$

$\|r-c_i\|^2$ being a square of an Euclidean distance between the received symbol r and the challenger $c_i$, and $\|r-d\|^2$ being a square of an Euclidean distance between the received symbol r and the hard demapper output d.

19. The computer readable medium of claim 18, wherein the soft bit $x_i$ is calculated using $x_i = m_i(2d_i - 1)$, $d_i$ being a bit numbered i of the hard demapper output d.

20. The computer readable medium of claim 16, wherein the demapping is done for odd quadrature amplitude modulation (QAM).

* * * * *